United States Patent
Stebbins (10) Patent No.: US 10,967,267 B2
(45) Date of Patent: Apr. 6, 2021

(54) CHANGING A CAMERA VIEW IN AN ELECTRONIC GAME

(71) Applicant: Roblox Corporation, San Mateo, CA (US)

(72) Inventor: Parker C. Stebbins, Dexter, MI (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 16/533,350

(22) Filed: Aug. 6, 2019

(65) Prior Publication Data
US 2021/0038985 A1 Feb. 11, 2021

(51) Int. Cl.
*A63F 9/24* (2006.01)
*A63F 11/00* (2006.01)
*A63F 13/5258* (2014.01)
*A63F 13/577* (2014.01)

(52) U.S. Cl.
CPC ........ *A63F 13/5258* (2014.09); *A63F 13/577* (2014.09)

(58) Field of Classification Search
USPC .............................. 463/1, 20, 22, 25, 31, 39
See application file for complete search history.

(56) References Cited

U.S. PATENT DOCUMENTS 9,972,122 B1 * 5/2018 Yee .................... G06T 15/30
2018/0276874 A1 * 9/2018 Myhill ................. G06T 15/20

OTHER PUBLICATIONS

WIPO, International Search Report for International Patent Application No. PCT/US2019/051518, dated Dec. 13, 2019, 2 pages.
WIPO, Written Opinion for International Patent Application No. PCT/US2019/051518, dated Dec. 13, 2019, 5 pages.

* cited by examiner

*Primary Examiner* — Adetokunbo O Torimiro
(74) *Attorney, Agent, or Firm* — IP Spring

(57) ABSTRACT

The camera view of an avatar traversing in a three-dimensional (3D) world in an electronic game may be changed to avoid occlusion of the avatar by a graphical object that in the camera view. The camera view may be moved forward towards the avatar to avoid the occlusion, and the camera view may then be moved backward away from the avatar after the avatar has passed the graphical object. Graphical objects that do not significantly occlude the avatar in the camera view may not trigger a change in the camera view.

20 Claims, 6 Drawing Sheets

CHANGING A CAMERA VIEW IN AN ELECTRONIC GAME

TECHNICAL FIELD

This disclosure relates generally to computer-based gaming, and more particularly but not exclusively, relates to methods, systems, and computer readable media to present a camera view in an electronic game.

BACKGROUND

Some online gaming platforms allow users (e.g., players) to navigate their avatars within a three-dimensional (3D) world. Using a mouse, keyboard, or other input mechanisms provided on their client devices, the users can control the running, walking, climbing, flying, etc. of their avatars through buildings, fields, forests, parks, mountains, and other environments in the 3D world, with various elements such as trees, walls, pillars, clouds, and other structures/objects being rendered as visual graphical representations within the 3D world.

Typically, the 3D world is presented in a camera view, as if a live camera is following the avatar as the avatar traverses from one point to another point through the 3D world. However, the camera views in many electronic games are often filled with jarring discontinuities and disruptive visual effects that are bothersome to many users.

SUMMARY

According to a first aspect, a method is provided to change camera views of a three-dimensional (3D) world rendered in an electronic game. The method includes: determining a speed and direction of traversal of a first graphical object rendered in the 3D world; identifying a second graphical object positioned along the direction of traversal; determining whether the second graphical object occludes, by at least a threshold level, the first graphical object in a current camera view during traversal of the first graphical object along the direction of traversal; in response to a determination that an occlusion of the first graphical object by the second graphical object exceeds at least the threshold level, changing the current camera view of the first graphical object to avoid the occlusion by the second graphical object by moving the camera view forward towards the first graphical object; and in response to a determination that the occlusion by the second graphical object is less than the threshold level, maintaining the current camera view.

According to another aspect, a non-transitory computer-readable medium is provided that has instructions stored thereon that, responsive to execution by a processor, cause the processor to perform or control performance of operations. The operations include: determine a speed and direction of traversal of a first graphical object rendered in a three-dimensional (3D) world of an electronic game; identify a second graphical object positioned along the direction of traversal; determine whether the second graphical object occludes, by at least a threshold level, the first graphical object in a current camera view during traversal of the first graphical object along the direction of traversal; in response to a determination that an occlusion of the first graphical object by the second graphical object exceeds at least the threshold level, change the current camera view of the first graphical object to avoid the occlusion by the second graphical object by movement of the camera view forward towards the first graphical object; and in response to a determination that the occlusion by the second graphical object is less than the threshold level, maintain the current camera view.

According to still another aspect, an apparatus is provided that includes: a user interface; and a processor coupled to the user interface and to a memory having a game application stored thereon, which in response to execution by the processor, cause the processor to present a camera view of a three-dimensional (3D) world of an electronic game on the user interface, wherein the game application is further executable by the processor to cause the processor to perform or control performance of operations. The operations include: determine a speed and direction of traversal of a first graphical object rendered in the 3D world; identify a second graphical object positioned along the direction of traversal; determine whether the second graphical object occludes, by at least a threshold level, the first graphical object in a current camera view during traversal of the first graphical object along the direction of traversal; in response to a determination that an occlusion of the first graphical object by the second graphical object exceeds at least the threshold level, change the current camera view of the first graphical object to avoid the occlusion by the second graphical object by movement of the camera view forward towards the first graphical object; and in response to a determination that the occlusion by the second graphical object is less than the threshold level, maintain the current camera view.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "one embodiment", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks in an electronic game, by selectively moving a camera view forward towards an avatar (so as to avoid an occlusion of the avatar in the camera view) depending on level of occlusion that would occur. Whether to keep the camera view stationary, to move the camera view forward, or to move the camera view backward can be dependent on several factors, such as the speed and direction that an avatar is traversing in a three-dimensional (3D) world in the electronic game, whether the occlusion is a hard occlusion, whether the occlusion is a soft occlusion, or other factors.

For example, a hard occlusion (such as a wall or other opaque graphical object) may cause the camera view to be moved forward so that the wall is removed from the camera view and therefore does not occlude the camera view of the avatar. A soft occlusion (such as a transparent window or other at least semi-transparent structure/object that only partially occludes the avatar) may cause the camera view be kept stationary (e.g., the camera view is not moved forward), such that the avatar can be seen moving behind the soft occlusion.

The direction and speed of the avatar, as the avatar traverses through the 3D world, can be used to determine whether to change the camera views. For example, if it is determined, e.g., by a game application, that the direction and speed of traversal will cause the avatar to pass behind a hard occlusion, the camera view is moved forward towards the avatar, in a direction perpendicular to the direction of traversal (so as to provide a non-occluded camera view of the avatar). As another example, if it is determined, e.g., by a game application, that the direction and speed of traversal will cause the avatar to pass behind a soft occlusion, the game application can control the camera view to remain stationary (not move forward towards the avatar, in the direction perpendicular to the direction of traversal), so that the camera view will show the avatar being partially occluded as the avatar traverses behind the soft occlusion.

The speed of the avatar's traversal and/or an amount of potential occlusion can also be used as factors/thresholds to determine whether to make a change in the camera view. As one example, the game application may determine that the avatar will traverse quickly behind a hard occlusion (such as a wall). Thus, even though the wall may occlude the avatar by up to a 100% occlusion, the avatar may be moving at a sufficient speed such that the 100% occlusion may occur for a short time window, e.g., less than a few second. In such a case, it may be determined that the duration of the total occlusion is acceptable, e.g., to render a smooth view of the game rather than moving the camera at a high speed, and so the game application may not move the camera view forward to avoid the occlusion. In another example, the avatar may pause/stop behind a soft occlusion (such as a narrow pole) that only partially occludes (such as only 10% occlusion) the avatar—in such a case, the duration of the partial occlusion may occur for more than a few seconds and so the game application may move the camera view forward to provide a full (non-occluded) view of the avatar.

Figure 1A:
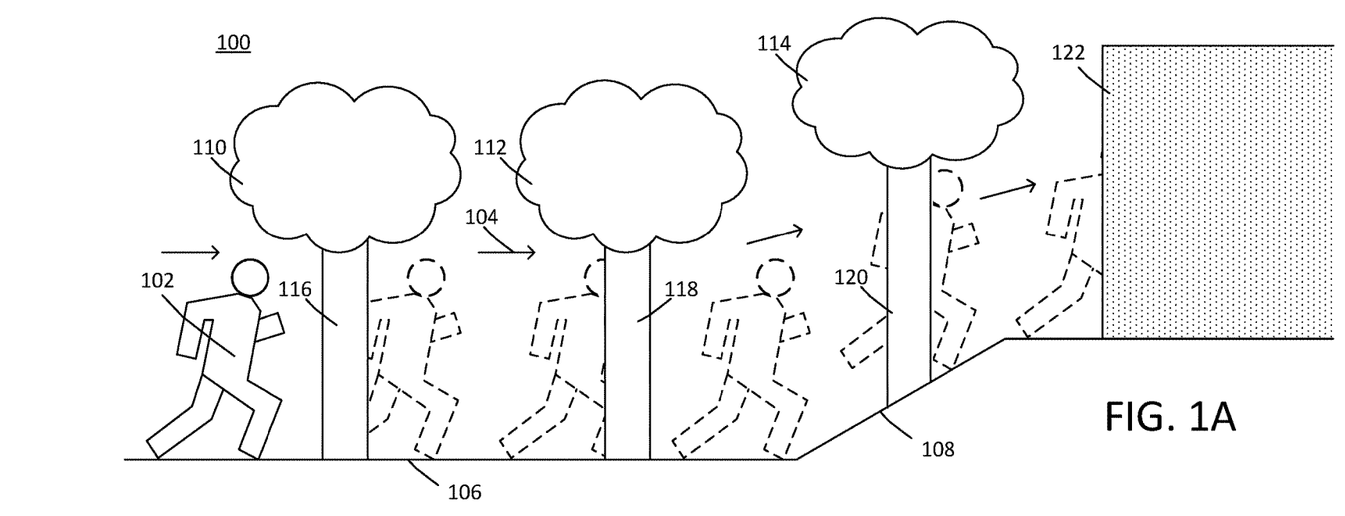
FIG. 1A is an example camera view of an avatar traversing through a 3D world, wherein the camera view has not moved forward.

Details of the above and other aspects can be further appreciated by referring to FIGS. 1A, 1B, 2A, and 2B. First, FIG. 1A is an example camera view 100 of an avatar 102 traversing through a 3D world in an electronic game. The camera view 100 may be, for example, a side view that is rendered on a user interface of a client device, so as to follow (e.g., pan along) the movement of the avatar 102 within the 3D world. The camera views shown and described herein may be provided by a "virtual camera" that can be positioned anywhere in the 3D world to generate the camera views and to generate different views. The position of the virtual camera can be updated/changed as well.

In some implementations, the avatar 102 may be a graphical object that represents the player/user who is operating the client device in order to play the electronic game. During the course of playing the electronic game, the avatar 102 is traversing (e.g., walking or running) from left to right in the 3D world, as represented by one or more arrows 104. As the avatar 102 traverses in the camera view 100 from left to right, the subsequent positions of the avatar 102 are depicted in FIG. 1A (as well as in the other figures) by the multiple broken-line representations of the avatar 102.

The camera view 100 shows that the avatar 102 is initially traversing along a substantially flat path 106, in the left-to-right direction. The flat path 106 may lie on a planar region (which could be represented by x-y coordinates) in the 3D world. The avatar 102 may also change elevations to climb an incline 108 (which could be represented by x-y-z coordinates) in the 3D world, as the avatar 102 continues to traverse from left to right.

A plurality of graphical objects may be rendered in the 3D world, in addition to the avatar 102. For example, the graphical objects can be trees 110, 112, and 114 that are present along the path 106 and the incline 108. The trees 110, 112, and 114 may have respective tree trunks 116, 118, and 120. Another graphical object may be a wall 122 (such as a wall of a building) at the top end of the incline 108.

The trees 110, 112, and 114 may have respective tree trunks 116, 118, and 120, which have a relatively thin profile such that the tree trunks 116, 118, and 120 do not fully occlude the avatar 102 as the avatar passes behind each of the tree trunks 116, 118, and 120. Each of the tree trunks 116, 118, and 120 may thus be thought of as a "soft" occlusion that enables at least a portion of the avatar 102 to be visible. Thus, for example in FIG. 1A, portions of the body of the avatar 102 (such as portions of the head, limbs, or torso) may remain visible in the camera view 100, while other portions of the body of the avatar 102 are occluded by the tree trunks 116, 118, and 120. As will be further described in detail with respect to FIG. 3 below, the amount and/or duration of the occlusion may be used to determine whether to keep the camera view 100 stationary (e.g., such as shown in FIG. 1A, wherein the tree trunks 116, 118, and 120 occlude some portion of the avatar 102 in the camera view 100), or whether to move the camera view 100 forward to a position between the avatar 102 and the tree trunks 116, 118, and 120, so as to show a non-occluded view of the avatar 102 as the avatar 102 traverses behind the tree trunks 116, 118, and 120.

Figure 1B:
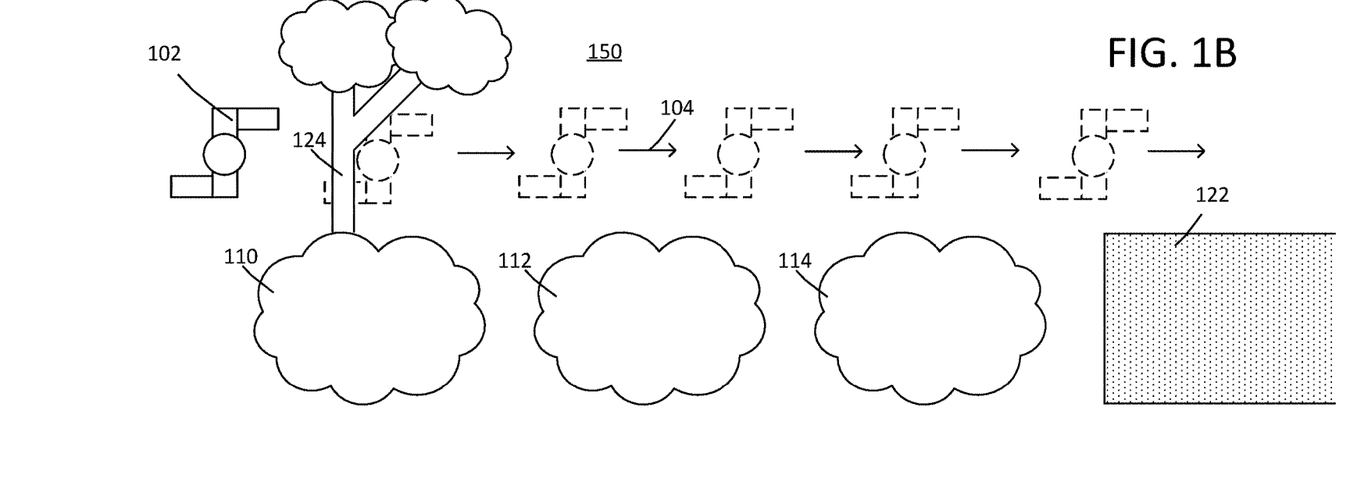
FIG. 1B is a top view of the avatar traversing through the 3D world of FIG. 1A.

FIG. 1B is a top view of the avatar 102 traversing through the 3D world of FIG. 1A. In one embodiment, the top view of FIG. 1B can be a camera view 150 that is rendered in the electronic game, such as if the user has selected an overhead planar view or a bird's eye view while playing the electronic game. Corresponding to the locations of the graphical objects shown in the camera view 100 of FIG. 1A, the camera view 150 of FIG. 1B shows the avatar 102 and its subsequent positions in broken lines, the arrows 104 depicting the direction of traversal of the avatar 102, the trees 110, 112, and 114, and the wall 122.

FIG. 1B shows that the tree 110 has an overhanging branch 124, under which the avatar 102 passes. Analogously to the camera view 100 in FIG. 1A, the camera view 150 in FIG. 1B has remained stationary such that the branch 124 is treated as a soft occlusion that occludes some portion of the avatar 102 as the avatar 102 traverses beneath the branch 124, while other portions of the avatar 102 remain visible beneath the branch 124. If there is a graphical object with a larger profile than the branch 124 (such as a thicker branch, a cloud, a highway overpass, etc.) that would have occluded a more significant portion of the avatar 102 (and/or for a longer duration of occlusion), the camera view 150 could be changed to move the camera view "between" such graphical object and the avatar 102, such that the avatar 102 would be non-occluded in the camera view.

Figure 2A:
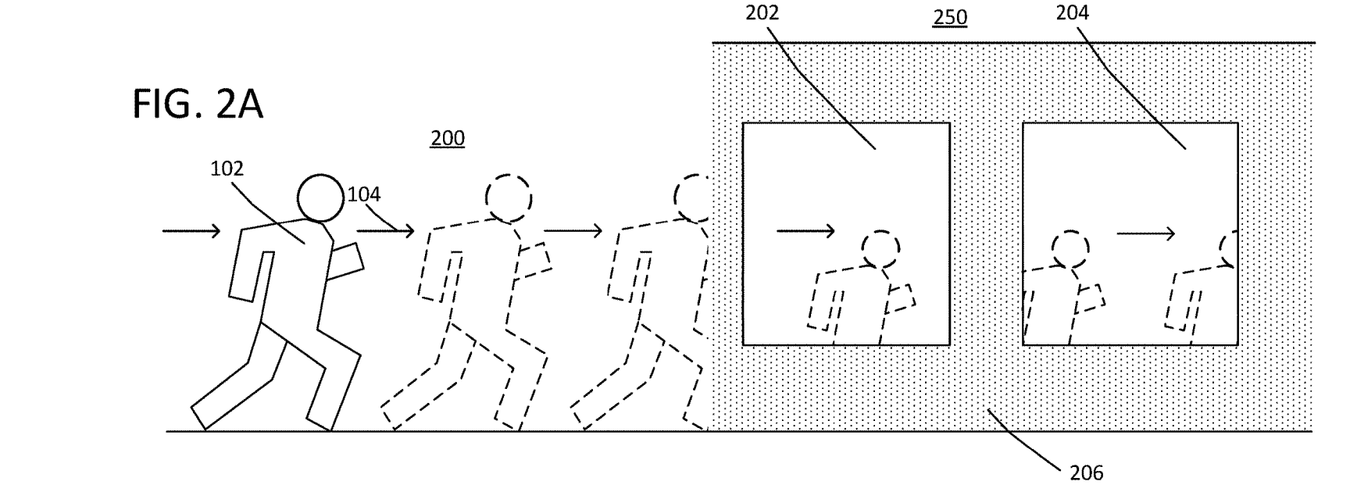
FIG. 2A is another example camera view of the avatar traversing through the 3D world, wherein the camera view has moved forward and then has moved backward.
Figure 2B:
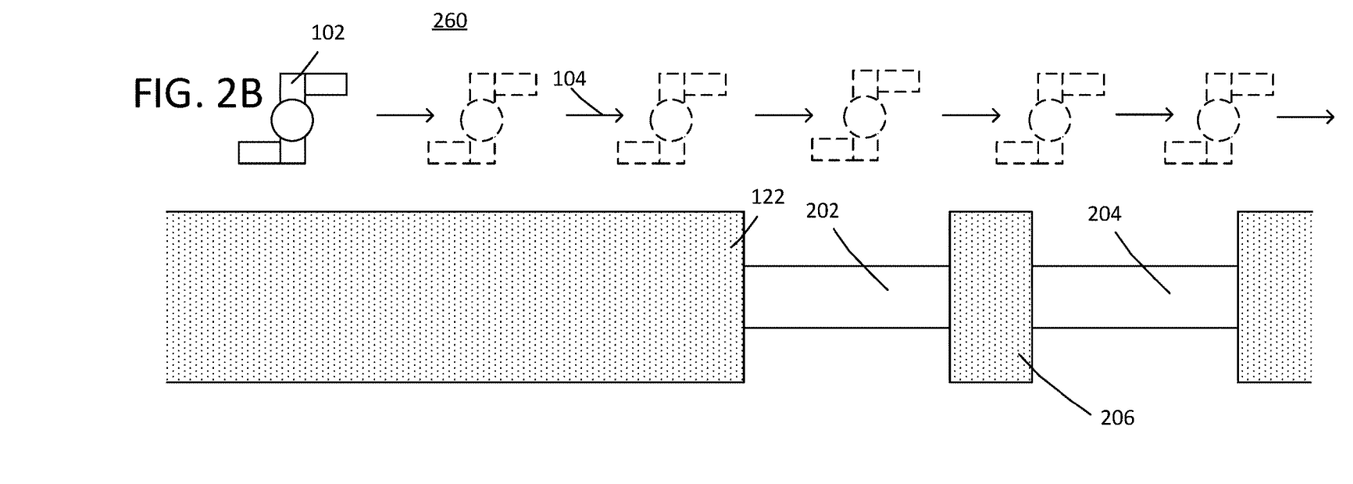
FIG. 2B is a top view of the avatar traversing through the 3D world of FIG. 2A.

As shown in FIGS. 1A and 1B, the avatar 102 is approaching the wall 122. If the camera view 100 remains unchanged while the avatar 102 is traversing behind the wall 122, the avatar 102 will be fully occluded by the wall 122. The wall 122 would can thus be considered to be a hard occlusion that would fully occlude the avatar 102. Accordingly, one embodiment changes the camera view such that the wall 122 does not occlude the avatar 102 while the avatar 102 is positioned behind the wall 122. FIGS. 2A and 2B illustrate this aspect in further detail.

Specifically, FIG. 2A is a camera view 200 of the avatar 102 traversing (again as depicted by the arrows 104 and the broken line representations of the avatar 102) behind the wall 122, wherein the camera view 200 has moved forward relative to the camera view 100 in FIG. 1A. Thus, in FIG. 2A, a camera that renders the camera view 200 is moved forward (towards the avatar 102 and in a direction perpendicular to the arrows 104) to a position between the wall 122 and the avatar 102 (e.g., has moved closer to the avatar 102). In this manner, the wall 122 disappears (e.g., is removed) from the camera view 200 and therefore no longer occludes the avatar 102. As shown in FIG. 2A, the avatar 102 is also shown as being rendered in an enlarged size, which represents that the camera view 200 has zoomed in closer to the avatar 102.

As shown in the corresponding position(s) of the avatar 102 in the top view of FIG. 2B, the wall 122 itself remains present and the avatar 102 is still traversing behind the wall 122. As explained above, and in comparison to what is shown in FIG. 1A, the camera view 200 is now excluding the wall 122 by virtue of being moved forward past the wall 122, thereby preventing the wall 122 from occluding the avatar 102 in the camera view 200.

In the examples of FIGS. 2A and 2B, the avatar 102 continues to traverse behind the wall 122 and reaches a portion of the wall 122 that includes windows 202 and 204 mounted on a window frame 206. The windows 202 and 204, as well as the window frame 206, can be considered as soft occlusions that would permit a portion of the avatar 102 to be visible when the avatar 102 traverses behind the windows 202 and 204 and window frame 206. For example, the windows 202 and 204 may be transparent or semi-transparent, and the window frame 206 may have a narrower profile relative to the profile of the avatar 102.

FIG. 2A further depicts a camera that generates the camera view 250 that has moved backward (away from the avatar 102 and in a direction perpendicular to the direction of traversal) relative to the camera view 200. That is, the camera that generates the camera view 250 has now moved back to its original position, so as to be in front of the windows 202 and 204 and the window frame 206. The avatar 102 is now smaller in size (back to its original size) relative to enlarged size in the camera view 200, and the avatar 102 is partially visible or partially occluded as the avatar 102 traverses behind the windows 202 and 204 and the window frame 206.

Figure 3:
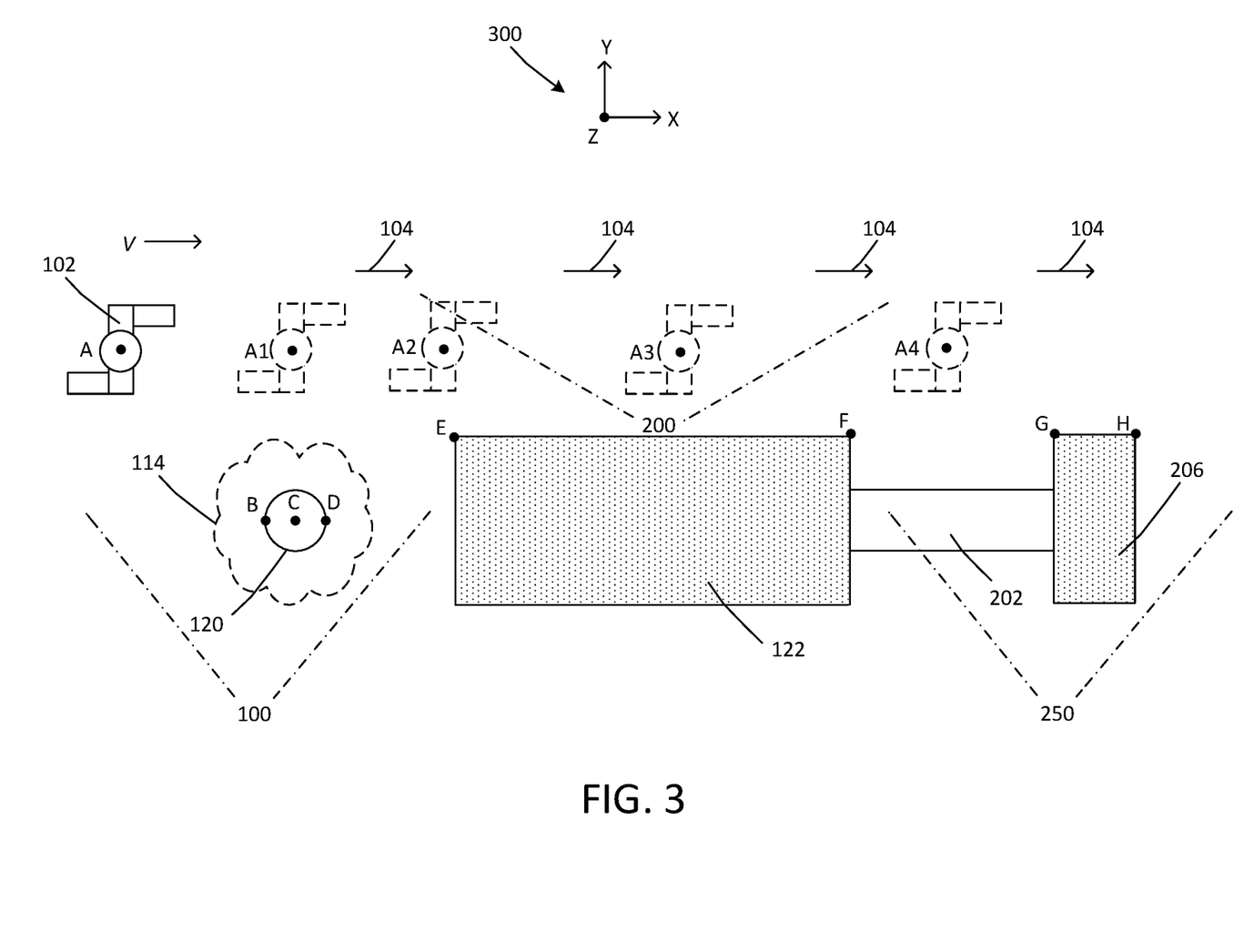
FIG. 3 is a diagram that illustrates example parameters that may be used to determine whether to change a camera view in an electronic game, in accordance with some implementations.

FIG. 3 is a diagram that illustrates example parameters that may be used to determine whether to change a camera view in an electronic game in accordance with some implementations. The various graphical elements and other information shown in FIG. 3 are labeled similarly as in FIGS. 1A, 1B, 2A, and 2B, so as to further aid in the understanding and for consistency.

Similar to FIGS. 1B and 2B, FIG. 3 represents a top view of the 3D world. The 3D world and the graphical elements contained therein may be laid out according to an x-y-z coordinate system 300 as one example, although other types of coordinate systems and techniques for identifying the relative locations and positions of the graphical elements may be used in different embodiments. In FIG. 3, the x-y coordinate axes lie on the plane of the drawing sheet, while the z-coordinates lie on an axis perpendicular to the plane of the drawing sheet. For the sake of simplicity of explanation, the avatar 102 is shown and described hereinafter as traversing only along the x-axis in the direction of the arrows 104, and is not traversing off the x-axis along the y-coordinates and the z-coordinates. It is understood that this single-dimensional traversal of the avatar 102 within the 3D world is merely an example, and that the player/user may navigate the avatar 102 in any direction in the coordinate system 300—the description below with respect to the single-dimensional movement of the avatar 102 along the x-axis can be applied to other movement of the avatar 102 along the y-axis and z-axis.

The avatar 102 is traversing along the x-axis at a particular speed v, which could be measured in terms of pixels per second across a display screen or other unit(s) of measurement. At any given instance in time, the position of the avatar 102 may be identified at points A, A1, A2, A3, A4, etc. in the coordinate system 300. The points A, A1, A2, A3, A4, etc. may correspond to a central axis running through the avatar 102, an edge of the avatar (such as a tip of a finger), or other location on the graphical representation of the body of the avatar 102 that is sufficient to identify the instantaneous position of the avatar 102 in the coordinate system 300. The positions of the other graphical elements in the 3D world may also be represented by one or more points B-H in the coordinate system 300. For example, the position of the tree trunk 120 of the tree 114 may be defined at point C along a central z-axis of the tree trunk 120. Alternatively or additionally, the edge boundaries of the tree trunk 120 may be identified at points B and D. Still alternatively or additionally, the point C along the z-axis of the tree trunk 120 may be used to identify the location of the tree trunk 120, and other configuration information can be used to specify the constant or varying edges of the tree trunk 120 (such as a radius in terms of pixels, measured from the point C and other points along the z-axis of the tree trunk 120).

In an analogous manner, the edges of the wall 122 may be positioned at points E and F, the edges of the window 202 may be positioned at points F and G, and the edges of the window frame 206 may be positioned at points G and H. The particular coordinates corresponding to the points A-H and other size/location information can be stored as properties/configuration information for each of the graphical elements in the 3D world.

The camera views 100, 200, and 250 of FIGS. 1A and 2A are also represented in FIG. 3 in broken lines. Beginning first with respect to the camera view 100, it is determined that the avatar 102 is traversing from point A towards point A1 and then towards point A2. In the region before (e.g., to the left of) the x-coordinate corresponding to points B or C, the game application determines that there is no graphical object that would occlude the avatar 102, and so the camera view 100 is left unchanged.

As the avatar 102 approaches the x-coordinate corresponding to points B or C, it is determined, e.g., by the game application (or a game engine), that a graphical object (e.g., the tree 114) lies proximate to the path of traversal of the avatar 102 and would occlude the avatar 102. However, the game application also determines that when the avatar 102 has reached point A1 (corresponding to the x-coordinate of point C where there may be the maximum amount of occlusion), the avatar 102 would not be fully occluded and/or would be occluded only momentarily. For instance, the maximum amount of occlusion could be less than 50% of the profile of the avatar 102, or less than some other threshold level. For example, the length between the points B and D of the diameter of the tree trunk 120 could be significantly shorter than the length of the visible profile of the avatar 102, and so the maximum amount of occlusion could less than 50% of the visible profile of the avatar 102. The 50% threshold amount is an example, and can be configured to other threshold amounts or ranges for the electronic game. Other thresholds or combinations thereof may be used. For instance, the threshold for determining whether to change the camera view can be based on time durations (e.g., an occlusion of 0.5 seconds or less), or a combination of time and amount of occlusion (e.g., an occlusion of 60% or more, for longer than 0.5 seconds, etc.). In this example, the game application keeps the camera view 100 unchanged (e.g., does not move the camera view forward) since the amount of occlusion does not meet a threshold for change in the camera view.

In some embodiments, the duration of occlusion can be used as an additional or alternative parameter to determine whether to change the camera view. For instance, the tree trunk 120 in some implementations may be sufficiently wide so as to occlude more than 50% of the profile of the avatar 102, perhaps even up to 100% occlusion. However, if the speed v of the avatar 102 is sufficiently high, such that the duration of occlusion would be less than 1 second or other threshold level of time that could be set for the electronic game, then the game application may not change the camera view 100 (e.g., the camera view 100 is kept stationary and is not moved forward). A reasoning for this is that the duration of the occlusion is sufficiently short in time, as compared to rapid movement of the camera in forward and backward directions, which may provide a camera view that has a high level of motion that is less pleasant as a user interface than a temporary occlusion.

In another example, the amount of the occlusion caused by the tree trunk 120 (or other graphical object) could be 50% or less, except that the user has decided to pause or slow down the speed v of the avatar 102 while the avatar is partially occluded. Thus, the duration of the occlusion could exceed 1 second or other threshold time amount that is set in the electronic game. In such a situation, the game application can change the camera view so as to move the camera view forward towards the avatar 102, thereby providing a non-occluded view of the avatar 102 while the avatar 102 is paused or moving slowly.

Continuing with FIG. 3, the avatar 102 has continued to traverse and has reached the point A2. The point A2 can be just prior to the x-coordinate of point E, exactly at the x-coordinate of point E, or just past the x-coordinate of point E. In this situation, the game application determines that the speed v and direction of traversal of the avatar 102 will place the avatar 102 behind the wall 122. The game application also knows from the configuration information that the wall 122 provides a hard occlusion that would fully occlude the avatar 102 between points E and F. As such, the game application changes the position of the camera such that the camera view is changed from the camera view 100 to the camera view 200, so as to move the camera view between the wall 122 and the avatar 102 while the avatar 102 is traversing between the x-coordinates corresponding to points E and F (e.g., while the avatar 102 is at point A3).

Subsequently when the avatar 102 approaches the x-coordinate of point F, is exactly at the x-coordinate of point F, or has just passed the x-coordinate of point F, the game application determines that the direction and speed of the traversal will cause the avatar 102 to pass behind the window 202 and the window frame 206, which are soft occlusions. Accordingly, the game application can change the camera position to change from the camera view 200 to the camera view 250, thereby moving the camera view backward to its original position. The avatar 102 would thus be fully visible behind the window 202 between points F and G, and partially occluded between points G and H. The forward and backward movement of the camera to provide the camera views 100, 150, 250, etc. may be a "jerky zoom" that avoids rendering the occluding graphical object during the transition, or may be a relatively smooth transition with the camera view gliding through the occluding graphical object. The type of transition can vary from one implementation to another, based on developer and/or player configuration settings.

The camera view 250 can thus be analogous to the camera view 100 described above, including possibly changing the camera view 250 depending on whether the avatar 102 pauses or slows down behind the soft occlusion caused by the window frame 206 between points G and H.

While FIGS. 1A, 1B, 2A, 2B, and 3 illustrate motion in an x-direction, it will be understood that avatars may move in any direction, e.g., in an x-y direction, in a y-z direction, or in a x-y-z direction, based on user input. For example, a lateral motion (e.g., indicated by a single arrow key being pressed on a keyboard, a gesture input in a single direction, etc.) may include motion along a single direction. In another example, a combination motion (e.g., indicated by two perpendicular arrow keys, e.g., Left and Up, being pressed simultaneously, by a "leap" gesture, etc.) may include motion in two or more directions. In different implementations, the camera that generates the camera view may be positioned in a direction generally perpendicular to the primary direction of motion, e.g., when the avatar moves left-to-right in a user interface, the camera may be positioned in a direction perpendicular to a screen that displays the avatar. In different implementations, movement of the avatar within the 3D world may be governed by rules specified by a developer of the game. In some implementations, each graphical object in the game may be stored in a data store with corresponding properties, e.g., dimensions, transparency level, color, texture, etc.

Figure 4:
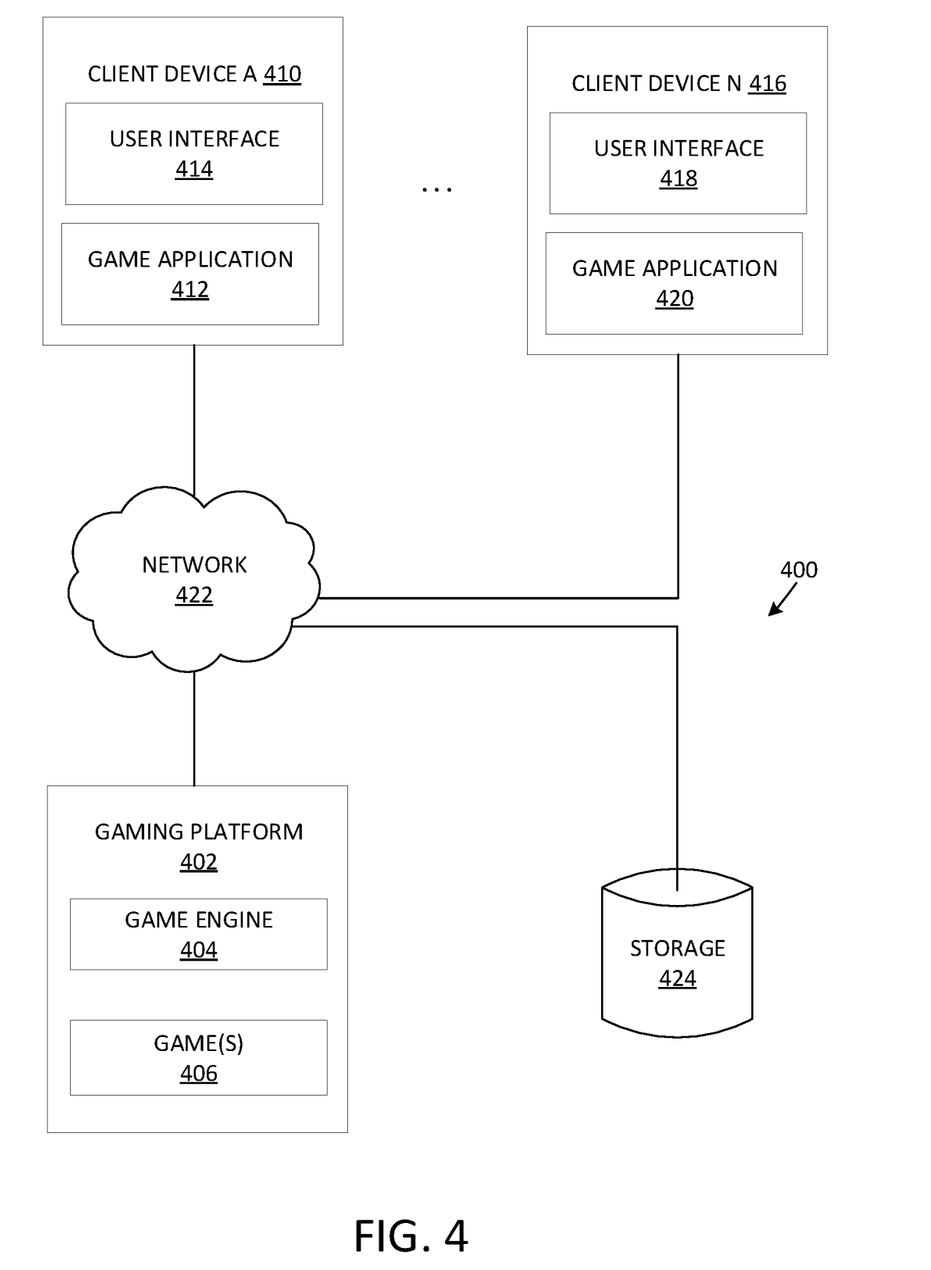
FIG. 4 is a diagram of an example system architecture for online gaming that can provide the camera views of FIGS. 1A, 1B, 2A, and 2B, in accordance with some implementations.

FIG. 4 is a diagram of an example system architecture for online gaming that can provide the camera views of FIGS. 1A, 1B, 2A, and 2B in accordance with some implementations. Online gaming platforms (also referred to as "user-generated content platforms" or "user-generated content systems") offer a variety of ways for users to interact with one another, such as while the users are playing an electronic game. For example, users of an online gaming platform may work together towards a common goal, share various virtual gaming items, send electronic messages to one another, and so forth. Users of an online gaming platform may play games using characters, such as the avatar 102 described above, which the users can navigate through a 3D world rendered in the electronic game.

An online gaming platform may also allow users of the platform to create and animate avatars, as well as allowing the users to create other graphical objects to place in the 3D world. For example, users of the online gaming platform may be allowed to create, design, and customize the avatar 102, and to create, design, and insert the wall 122, the window 202, and other graphical objects in the 3D world.

In FIG. 4, an example system architecture 400 (also referred to as "system" herein) includes an online gaming platform 402, a first client device 410 (generally referred to as "client device(s) 410" herein) and at least one second client device 416. The online gaming platform 402 can include, among other things, a game engine 404 and one or more electronic games 406. The system architecture 400 is provided for illustration of one possible implementation. In other implementations, the system architecture 400 may include the same, fewer, more, or different elements configured in the same or different manner as that shown in FIG. 4.

A communication network 422 may be used for communication between the online gaming platform 402 and the client devices 410/416, and/or between other elements in the system architecture 400. The network 422 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long term evolution (LTE) network), routers, hubs, switches, server computers, or a combination thereof.

The client device 410 can include a game application 412 and one or more user interfaces 414 (e.g., audio/video input/output devices). The client device 416 can include a game application 420 and user interfaces 418 (e.g., audio/video input/output devices). The audio/video input/output devices can include one or more of a microphone, speakers, headphones, display device, etc.

The system architecture 400 may further include one or more storage devices 424. The storage device 404 may be, for example, a storage device located within the online gaming platform 402 or communicatively coupled to the online gaming platform 402 via the network 422 (such as depicted in FIG. 4). The storage device 404 may store, for example, graphical objects that are rendered in the game 406 by the game engine 404 or by the game applications 412/420, as well as the configuration/properties information of the graphical objects (such as the coordinate information, size dimensions, etc. described above). In some embodiments, the storage device 404 can be part of a separate content delivery network that provides the graphical objects rendered in the game 406. For instance, the game application 412 may pull (or have pushed to it) graphical objects stored in the storage device 424, for presentation during the course of playing the game.

In one implementation, the storage device 424 may be a non-transitory computer readable memory (e.g., random access memory), a cache, a drive (e.g., a hard drive), a flash drive, a database system, or another type of component or device capable of storing data and other content. The storage device 424 may also include multiple storage components (e.g., multiple drives or multiple databases) that may also span multiple computing devices (e.g., multiple server computers).

In some implementations, the online gaming platform 402 can include a server having one or more computing devices (e.g., a cloud computing system, a rackmount server, a server computer, cluster of physical servers, etc.). In some implementations, a server may be included in the online gaming platform 402, be an independent system, or be part of another system or platform.

In some implementations, the online gaming platform 402 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 402 and to provide a user with access to online gaming platform 402. The online gaming platform 402 may also include a website (e.g., a webpage) or application back-end software that may be used to provide a user with access to content provided by online gaming platform 402. For example, a user may access online gaming platform 402 using the game application 412 on the client device 410.

In some implementations, online gaming platform 402 may be a type of social network providing connections between users or a type of user-generated content system that allows users (e.g., end-users or consumers) to communicate with other users on the online gaming platform 402, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 402 may be a virtual gaming platform. For example, the gaming platform may provide single-player or multiplayer games to a community of users that may access or interact with games using client devices 410 via the network 422. In some implementations, games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., the client device 410 and/or 416) within a game (e.g., the game 406) or the presentation of the interaction on a display or other user interfaces (e.g., the user interface 414/418) of a client device 410 or 416.

In some implementations, the game 406 can include an electronic file that can be executed or loaded using software, firmware or hardware configured to present the game content (e.g., digital media item) to an entity. In some implementations, the game application 412 may be executed and the game 406 rendered in connection with the game engine 404. In some implementations, the game 406 may have a common set of rules or common goal, and the environments of a game 406 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a 3D environment. The one or more environments of the game 406 may be collectively referred to a "world" or "gaming world" or "virtual world" or "universe" herein. An example of a world may be a 3D world of the game 406, such as illustrated in FIGS. 1A, 1B, 2A, 2B, and 3 above. For example, a user may build a virtual environment that is linked to another virtual environment created by another user. A character of the virtual game may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online gaming platform 402 can host one or more games 406 and can permit users to interact with the games 406 using the game application 412 of the client device 410. Users of the online gaming platform 402 may play, create, interact with, or build games 406, communicate with other users, and/or create and build objects (e.g., also referred to as "item(s)" or "game objects" or "virtual game item(s)" or "graphical objects" herein) of games 406. For example, in generating user-generated virtual items, users may create characters, animation for the characters, decoration for the characters, one or more virtual environments for an interactive game, or build structures used in the game 406, among others. In some implementations, users may buy, sell, or trade game virtual game objects, such as in-platform currency (e.g., virtual currency), with other users of the online gaming platform 402. In some implementations, online gaming platform 402 may transmit game content to game applications (e.g., the game application 412). In some implementations, game content (also referred to as "content" herein) may refer to any data or software instructions (e.g., game objects, game, user information, video, images, commands, media item, etc.) associated with online gaming platform 402 or game applications. In some implementations, game objects (e.g., also referred to as "item(s)" or "objects" or "virtual game item(s)" herein) may refer to objects that are used, created, shared, or otherwise depicted in the game 406 of the online gaming platform 402 or game applications 412 or 420 of the client devices 410/416. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the online gaming platform 406 hosting games 406, is provided for purposes of illustration. In some implementations, online gaming platform 402 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, the game 406 may be associated with a particular user or a particular group of users (e.g., a private game), or made widely available to users of the online gaming platform 402 (e.g., a public game). In some implementations, where online gaming platform 402 associates one or more games 406 with a specific user or group of users, online gaming platform 402 may associate the specific user(s) with a game 402 using user account information (e.g., a user account identifier such as username and password).

In some implementations, online gaming platform 402 or client devices 410/416 may include the game engine 404 or game application 412/420. In some implementations, game engine 404 may be used for the development or execution of games 406. For example, game engine 406 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 404 may generate commands that help compute and render the game (e.g., rendering commands, collision commands, animation commands, physics commands, etc.) In some implementations, game applications 412/418 of client devices 410/416, respectively, may work independently, in collaboration with game engine 404 of online gaming platform 402, or a combination of both.

In some implementations, both the online gaming platform 402 and client devices 410/416 execute a game engine or a game application (404, 412, 420, respectively). The online gaming platform 402 using game engine 404 may perform some or all the game engine functions (e.g., generate physics commands, animation commands, rendering commands, etc., including controlling the changes to the camera views described above), or offload some or all the game engine functions to the game application 412 of client device 410. In some implementations, each game 406 may have a different ratio between the game engine functions that are performed on the online gaming platform 402 and the game engine functions that are performed on the client devices 410 and 416.

For example, the game engine 404 of the online gaming platform 402 may be used to generate physics commands in cases where there is a collision between at least two game objects, while the additional game engine functionality (e.g., generate rendering commands, including changing the camera views) may be offloaded to the client device 410. In some implementations, the ratio of game engine functions performed on the online gaming platform 402 and client device 410 may be changed (e.g., dynamically) based on gameplay conditions. For example, if the number of users participating in gameplay of a particular game 406 exceeds a threshold number, the online gaming platform 402 may perform one or more game engine functions that were previously performed by the client devices 410 or 416.

For example, users may be playing a game 406 on client devices 410 and 416, and may send control instructions (e.g., user inputs, such as right, left, up, down, user election, or character position and velocity information, etc.) to the online gaming platform 402. Subsequent to receiving control instructions from the client devices 410 and 416, the online gaming platform 402 may send gameplay instructions (e.g., position and velocity information of the characters participating in the group gameplay or commands, such as rendering commands, collision commands, etc.) to the client devices 410 and 416 based on control instructions. For instance, the online gaming platform 402 may perform one or more logical operations (e.g., using game engine 404) on the control instructions to generate gameplay instruction for the client devices 410 and 416. In other instances, online gaming platform 402 may pass one or more or the control instructions from one client device 410 to other client devices (e.g., the client device 416) participating in the game 406. The client devices 410 and 416 may use the gameplay instructions and render the gameplay for presentation on the displays of client devices 410 and 416, including the adjustable camera views described above.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 402. In other implementations, the control instructions may be sent from the client device 410 to another client device (e.g., the client device 416), where the other client device generates gameplay instructions using the local game engine application 420. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow the client device 110 to render gameplay of a game, such as a multiplayer game. The gameplay instructions may include one or more of user input (e.g., control instructions), character position and velocity information, or commands (e.g., physics commands, animation commands, rendering commands, collision commands, etc.).

In some implementations, the client device(s) 410 or 416 may each include computing devices such as personal computers (PCs), mobile devices (e.g., laptops, mobile phones, smart phones, tablet computers, or netbook computers), network-connected televisions, gaming consoles, etc. In some implementations, a client device 410 or 416 may also be referred to as a "user device." In some implementations, one or more client devices 410 or 416 may connect to the online gaming platform 402 at any given moment. It may be noted that the number of client devices 410 or 416 is provided as illustration, rather than limitation. In some implementations, any number of client devices 410 or 416 may be used.

In some implementations, each client device 410 or 416 may include an instance of the game application 412 or 420, respectively. In one implementation, the game application 412 or 420 may permit users to use and interact with online gaming platform 402, such as control a virtual character in a virtual game hosted by online gaming platform 402, or view or upload content, such as games 406, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 410 or 416 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 412/420 may be an online gaming platform application for users to build, create, edit, upload content to the online gaming platform 402 as well as interact with online gaming platform 402 (e.g., play games 406 hosted by online gaming platform 402). As such, the game application 412/420 may be provided to the client device 410 or 416 by the online gaming platform 402. In another example, the game application may be an application that is downloaded from a server.

In some implementations, a user may login to online gaming platform 402 via the game application. The user may access a user account by providing user account information (e.g., username and password) where the user account is associated with one or more characters available to participate in one or more games 406 of online gaming platform 402.

In general, functions described in one implementation as being performed by the online gaming platform 402 can also be performed by the client device(s) 410 or 416, or a server, in other implementations if appropriate. In addition, the functionality attributed to a particular component can be performed by different or multiple components operating together. The online gaming platform 402 can also be accessed as a service provided to other systems or devices through appropriate application programming interfaces (APIs), and thus is not limited to use in websites.

Figure 5:
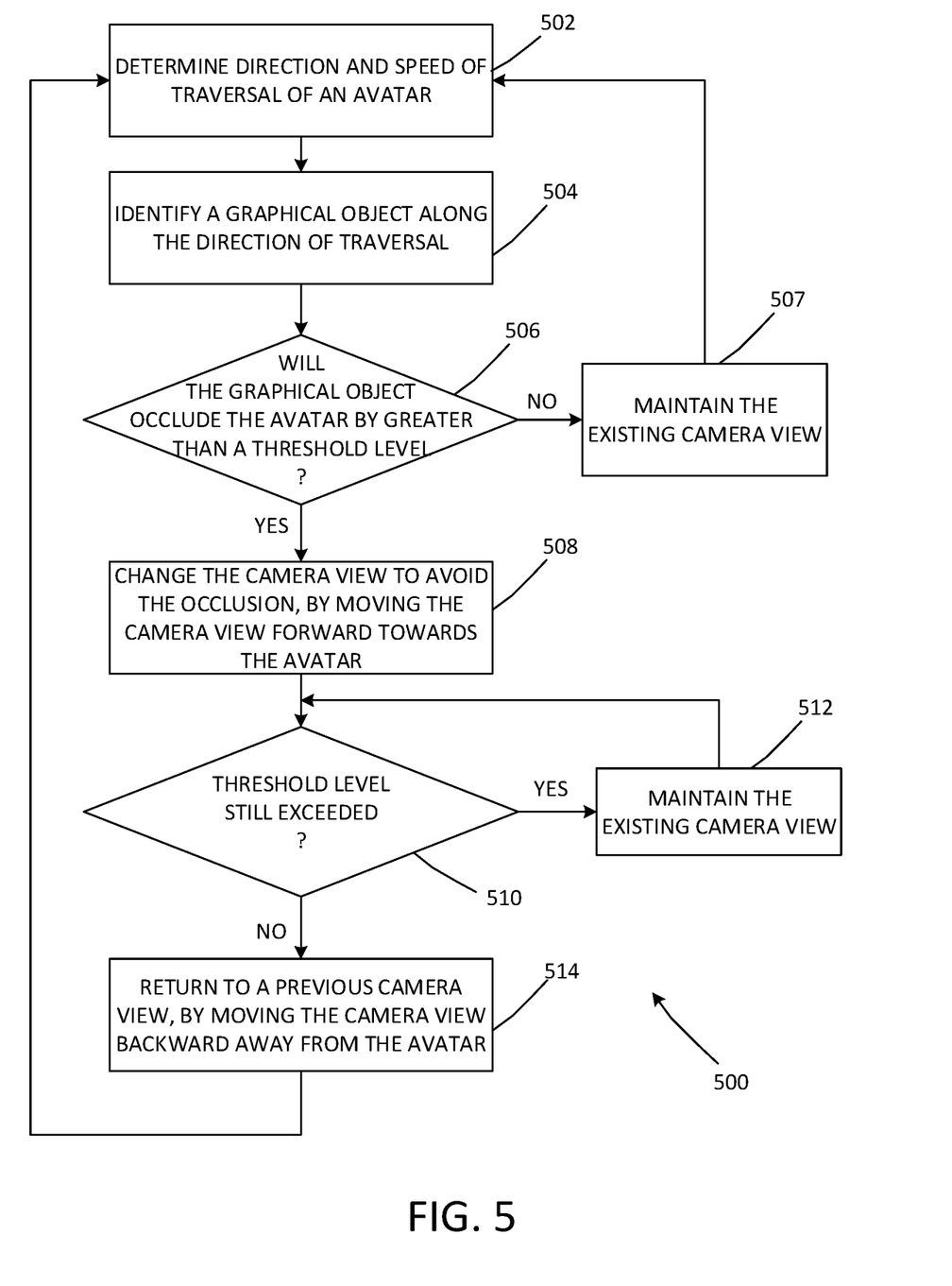
FIG. 5 is a flowchart illustrating a method to change a camera view in an electronic game, in accordance with some implementations.

FIG. 5 is a flowchart illustrating a method 500 to change a camera view in an electronic game in accordance with some implementations. For the sake of simplicity, the various operations in the method 500 will be described in the context of the game application 412 performing the operations. However, and as previously described above with respect to FIG. 4, some of the operations may be performed alternatively or additionally, in whole or in part, by the game engine 404 at the gaming platform 402. The example method 500 may include one or more operations illustrated by one or more blocks, such as blocks 502 to 514. The various blocks of the method 500 and/or of any other process(es) described herein may be combined into fewer blocks, divided into additional blocks, supplemented with further blocks, and/or eliminated based upon the desired implementation.

The method 500 of FIG. 5 can be explained herein with reference to the elements shown in FIGS. 1A, 1B, 2A, 2B, and 3. In one embodiment, the operations of the method 500 may be performed in a pipelined sequential manner. In other embodiments, some operations may be performed out-of-order, in parallel, etc.

At a block 502 ("DETERMINE DIRECTION AND SPEED OF TRAVERSAL OF AN AVATAR"), the user is playing an electronic game, including moving a graphical object such as the avatar 102 within a 3D world. The game application 412 identifies the speed (such as pixels per second) and direction (such as a particular direction along the coordinate system 300) of traversal of the avatar 102 within the 3D world. The block 502 may be followed by a block 504.

At the block 504 ("IDENTIFY A GRAPHICAL OBJECT ALONG THE DIRECTION OF TRAVERSAL"), the game application 412 compares the direction of traversal of the avatar 102 against the settings/properties information of the electronic game, so as to identify a graphical object positioned along the direction of traversal. For example, in FIGS. 1A and 3, the graphical object could be the tree trunk 120 or the wall 122 having coordinates in the coordinate system 300 that the game application 412 determines to be positioned along the direction of traversal of the avatar 102. The block 504 may be followed by a block 506.

At the block 506 ("WILL THE GRAPHICAL OBJECT OCCLUDE THE AVATAR BY GREATER THAN A TRESHOLD LEVEL?"), the game application 412 determines whether the graphical object will occlude the avatar 102 in the current camera view, and if so, by how much. For example, the game application 412 may determine that the avatar 102 will be traversing behind the graphical object (such as shown in FIGS. 1A and 2A) such that the graphical object would occlude the avatar 102 in the current camera view. If there is a potential occlusion, then the game application 412 determines the level of occlusion, by referencing the level of occlusion against a threshold level.

For instance, the threshold level could be an amount threshold, such as in the example provided above where the threshold level is set at 50% occlusion (or some other threshold level). Occlusions of less than 50% can be deemed to be soft occlusions, while occlusions of greater than 50% can be deemed to be hard occlusions. The threshold that the game application 412 compares against may also be a time threshold, such as whether the speed of traversal of the avatar will cause an occlusion to occur for only a short duration of time or for a relatively longer duration of time.

If, at the block 506, the game application 412 determines that the threshold level will not be exceeded ("NO" at the block 506), then the game application 412 does not change the camera view at a block 507 ("MAINTAIN THE EXISTING CAMERA VIEW"). For instance, the camera view is not moved forward towards the avatar 102 in a manner that would remove the graphical object from the camera view. The block 507 may be followed by the block 502.

If, however at the block 506, the game application 412 determines that the threshold level will be exceeded ("YES" at the block 506), then the game application 412 changes the camera view at a block 508 ("CHANGE THE CAMERA VIEW TO AVOID THE OCCLUSION, BY MOVING THE CAMERA VIEW FORWARD TOWARDS THE AVATAR"). For example and as shown in FIG. 2A, the camera view is moved forward to a position between the wall 122 and the avatar 102, such that the wall 122 is removed from the camera view and an enlarged non-occluded avatar 102 is rendered in the camera view. The block 508 may be followed by a block 510.

At the block 510 ("THRESHOLD LEVEL STILL EXCEEDED?"), the game application 412 determines whether the occlusion would still remain above the threshold, if the camera view is moved backward to the original position. For example, while the avatar 102 is still traversing behind the wall 122, the threshold would still be exceeded ("YES" at the block 510) if the camera view is returned (moved backward) to the previous camera view, and so the game application keeps the existing camera view unchanged at a block 512 ("MAINTAIN THE EXISTING CAMERA VIEW"). In another example, the avatar 102 may have passed the wall 122 and has immediately encountered an additional graphical object that would result in the occlusion being over the threshold (another "YES" at the block 510)—in such situation, the game application 412 would continue to maintain the existing camera view so as to exclude the additional graphical object from the camera view, rather than moving the camera view backwards away from the avatar 102. The block 512 may be followed by the block 510.

If, however at the block 510, the threshold level for an occlusion is no longer exceeded ("NO" at the block 510), then the camera view may be changed again so as to move backward away from the avatar 102 at a block 514 ("RETURN TO A PREVIOUS CAMERA VIEW, BY MOVING THE CAMERA VIEW BACKWARD AWAY FROM THE AVATAR"). For example, the avatar 102 may have now passed the wall 122 and is traversing along a path where there are no graphical objects or where graphical objects exist but would not meet the threshold level for occlusion. In this situation, the camera view can revert to a previous position where the camera view is not moved forward towards the avatar 102.

The method 500 then returns to the block 502 to continue monitoring the speed and direction of traversal of the avatar 102. The method 500 can be repeated as the avatar 102 continues to move through the 3D world.

Figure 6:
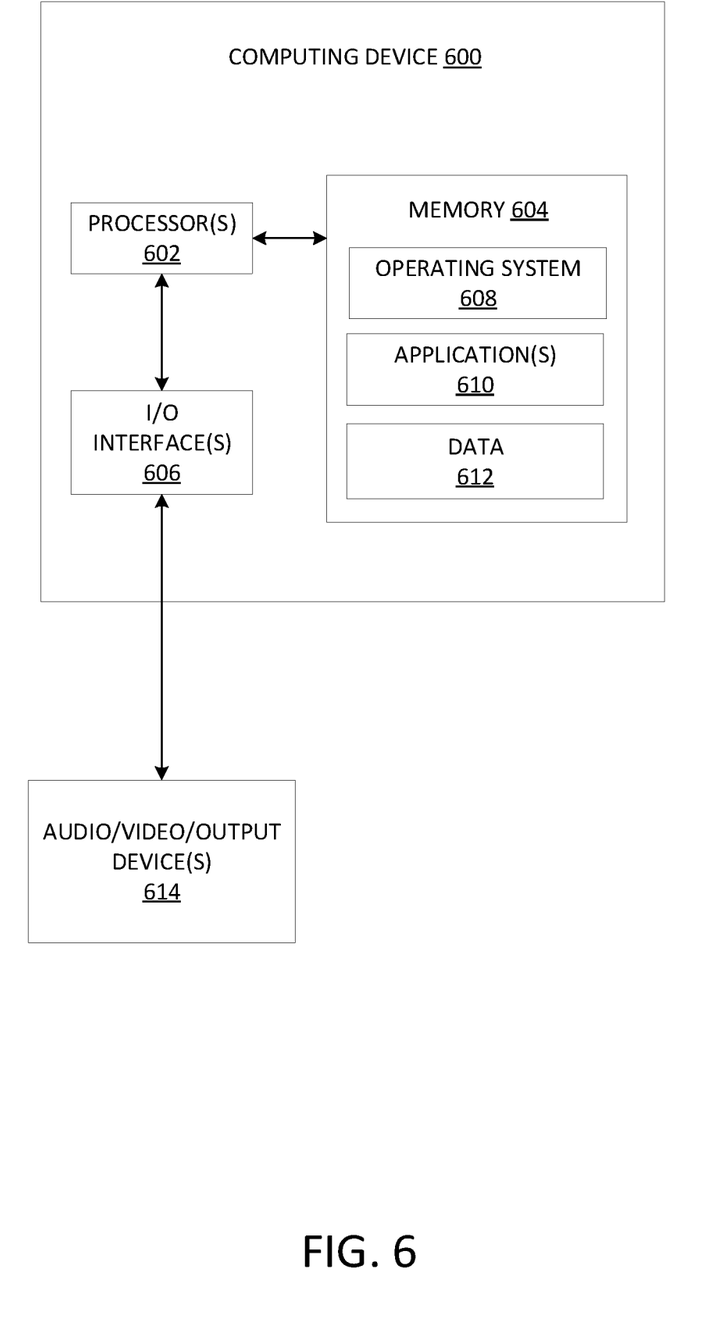
FIG. 6 is a block diagram illustrating an example computing device, in accordance with some implementations.

FIG. 6 is a block diagram of an example computing device 600 which may be used to implement one or more features described herein. The client devices 410 and 416 and/or the gaming platform 402 of FIG. 4 may be provided in the form of the computing device 600 of FIG. 6. In one example, the computing device 600 may be used to perform the methods described herein. The computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, the device 600 includes a processor 602, a memory 606, an input/output (I/O) interface 606, and audio/video input/output devices 614.

The processor 602 can be one or more processors and/or processing circuits to execute program code and control basic operations of the computing device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations.

For example, a processor may perform its functions in "real-time," "offline," in a "batch mode," etc. Portions of processing may be performed at different times and at different locations, by different (or the same) processing systems. A computer may be any processor in communication with a memory.

The memory 604 may be provided in the computing device 600 for access by the processor 602, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 602 and/or integrated therewith. The memory 604 can store software executable on the computing device 600 by the processor 602, including an operating system 608, one or more applications 610 and its related data 612. The application 610 can be used to embody the game applications 412/420 or the game engine 404. In some implementations, the application 610 can include instructions that, in response to execution by the processor 602, enable the processor 602 to perform or control performance of the operations described herein with respect to determining whether to change a camera view and then changing the camera view accordingly.

Any of software in the memory 604 can alternatively be stored on any other suitable storage location or computer-readable medium. In addition, memory 604 (and/or other connected storage device(s)) can store instructions and data used in the features described herein. The memory 604 and any other type of storage (magnetic disk, optical disk, magnetic tape, or other tangible media) can be considered "storage" or "storage devices."

The I/O interface 606 can provide functions to enable interfacing the computing device 600 with other systems and devices. For example, network communication devices, storage devices, and input/output devices can communicate with the computing device 600 via an I/O interface 606. In some implementations, the I/O interface 606 can connect to interface devices including input devices (keyboard, pointing device, touchscreen, microphone, camera, scanner, etc.) and/or output devices (display device, speaker devices, printer, motor, etc.), which are collectively shown as at least one audio/video input/output device 614.

The audio/video input/output devices 614 can include an audio input device (e.g., a microphone, etc.) that can be used to receive audio messages as input, an audio output device (e.g., speakers, headphones, etc.) and/or a display device, that can be used to provide graphical and visual output such as the example camera views described above.

For ease of illustration, FIG. 6 shows one block for each of processor 602, memory 604, I/O interface 606, the application 610, etc. These blocks may represent one or more processors or processing circuitries, operating systems, memories, I/O interfaces, applications, and/or software modules. In other implementations, the device 600 may not have all of the components shown and/or may have other elements including other types of elements instead of, or in addition to, those shown herein.

A user device can also implement and/or be used with features described herein. Example user devices can be computer devices including some similar components as the computing device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method to change camera views of a three-dimensional (3D) world rendered in an electronic game, the method comprising:
   determining a speed and direction of traversal of a first graphical object rendered in the 3D world;
   identifying a second graphical object positioned along the direction of traversal;
   determining whether the second graphical object occludes, by at least a threshold level, the first graphical object in a current camera view during traversal of the first graphical object along the direction of traversal;
   in response to a determination that an occlusion of the first graphical object by the second graphical object exceeds at least the threshold level, changing the current camera view of the first graphical object to avoid the occlusion by the second graphical object by moving the camera view forward towards the first graphical object; and
   in response to a determination that the occlusion by the second graphical object is less than the threshold level, maintaining the current camera view, wherein the occlusion by the second graphical object is less than the threshold level if the second graphical object is an at least semi-transparent graphical object through which the first graphical object is visible in the current camera view.

2. The method of claim 1, wherein the first graphical object includes an avatar associated with a player of the electronic game, and wherein the speed and direction of traversal of the first graphical object is controllable by the player.

3. The method of claim 1, wherein the threshold level is associated with an amount of a profile of the first graphical object that is occluded by the second graphical object.

4. The method of claim 1, wherein the threshold level is associated with a time duration, associated with the speed of the traversal, in which a profile of the first graphical object is occluded by the second graphical object.

5. The method of claim 1, further comprising:
   after moving the camera view forward towards the first graphical object to avoid the occlusion by the second graphical object, moving the camera view backward away from the first graphical object, in response to the first graphical object having passed the second graphical object along the direction of traversal.

6. The method of claim 1, further comprising:
   maintaining the camera view that is moved forward towards the first graphical object, while first graphical object is positioned behind the second graphical object or in response to identifying a third graphical object that is positioned along the direction of traversal immediately after the second graphical object and that occludes the first graphical object by at least the threshold level.

7. The method of claim 1, wherein the at least semi-transparent graphical object through which the first graphical object is visible in the current camera view comprises a transparent window through which the first graphical object is visible.

8. A non-transitory computer-readable medium having instructions stored thereon that, responsive to execution by a processor, cause the processor to perform or control performance of operations that comprise:
   determine a speed and direction of traversal of a first graphical object rendered in a three-dimensional (3D) world of an electronic game;
   identify a second graphical object positioned along the direction of traversal;
   determine whether the second graphical object occludes, by at least a threshold level, the first graphical object in a current camera view during traversal of the first graphical object along the direction of traversal;
   in response to a determination that an occlusion of the first graphical object by the second graphical object exceeds at least the threshold level, change the current camera view of the first graphical object to avoid the occlusion by the second graphical object by movement of the camera view forward towards the first graphical object; and
   in response to a determination that the occlusion by the second graphical object is less than the threshold level, maintain the current camera view, wherein the occlusion by the second graphical object is less than the threshold level if the second graphical object is at least a semi-transparent graphical object through which the first graphical object is visible in the current camera view.

9. The non-transitory computer-readable medium of claim 8, wherein the first graphical object includes an avatar associated with a player of the electronic game, and wherein the speed and direction of traversal of the first graphical object is controllable by the player.

10. The non-transitory computer-readable medium of claim 8, wherein the threshold level is associated with an amount of a profile of the first graphical object that is occluded by the second graphical object.

11. The non-transitory computer-readable medium of claim 8, wherein the threshold level is associated with a time duration, associated with the speed of the traversal, in which a profile of the first graphical object is occluded by the second graphical object.

12. The non-transitory computer-readable medium of claim 8, wherein the operations further comprise:
   after the camera view has moved forward towards the first graphical object to avoid the occlusion by the second graphical object, move the camera view backward away from the first graphical object, in response to the first graphical object having passed the second graphical object along the direction of traversal.

13. The non-transitory computer-readable medium of claim 8, wherein the operations further comprise:
   maintain the camera view that is moved forward towards the first graphical object, while first graphical object is positioned behind the second graphical object or in response to identification of a third graphical object that is positioned along the direction of traversal immediately after the second graphical object and that occludes the first graphical object by at least the threshold level.

14. The non-transitory computer-readable medium of claim 8, wherein the at least semi-transparent graphical object through which the first graphical object is visible in the current camera view comprises a transparent window through which the first graphical object is visible.

15. An apparatus, comprising:
a user interface; and
a processor coupled to the user interface and to a memory having a game application stored thereon, which in response to execution by the processor, cause the processor to present a camera view of a three-dimensional (3D) world of an electronic game on the user interface, wherein the game application is further executable by the processor to cause the processor to perform or control performance of operations that include:
- determine a speed and direction of traversal of a first graphical object rendered in the 3D world;
- identify a second graphical object positioned along the direction of traversal;
- determine whether the second graphical object occludes, by at least a threshold level, the first graphical object in a current camera view during traversal of the first graphical object along the direction of traversal;
- in response to a determination that an occlusion of the first graphical object by the second graphical object exceeds at least the threshold level, change the current camera view of the first graphical object to avoid the occlusion by the second graphical object by movement of the camera view forward towards the first graphical object; and
- in response to a determination that the occlusion by the second graphical object is less than the threshold level, maintain the current camera view, wherein the occlusion by the second graphical object is less than the threshold level if the second graphical object is an at least semi-transparent graphical object through which the first graphical object is visible in the current camera view.

16. The apparatus of claim 15, wherein the first graphical object includes an avatar associated with a player of the electronic game, and wherein the speed and direction of traversal of the first graphical object is controllable by the player.

17. The apparatus of claim 15, wherein the threshold level is associated with an amount of a profile of the first graphical object that is occluded by the second graphical object.

18. The apparatus of claim 15, wherein the threshold level is associated with a time duration, associated with the speed of the traversal, in which a profile of the first graphical object is occluded by the second graphical object.

19. The apparatus of claim 15, wherein after the camera view has moved forward towards the first graphical object to avoid the occlusion by the second graphical object, the game application is further executable by the processor to cause the processor to perform or control performance of:
- move the camera view backward away from the first graphical object, in response to the first graphical object having passed the second graphical object along the direction of traversal.

20. The apparatus of claim 15, wherein the game application is further executable by the processor to cause the processor to perform or control performance of:
- maintain the camera view that is moved forward towards the first graphical object, while first graphical object is positioned behind the second graphical object or in response to identification of a third graphical object that is positioned along the direction of traversal immediately after the second graphical object and that occludes the first graphical object by at least the threshold level.

* * * * *